(12) United States Patent
Zillner

(10) Patent No.: US 12,159,254 B2
(45) Date of Patent: Dec. 3, 2024

(54) APPARATUS FOR THE SEMANTIC-BASED OPTIMIZATION OF PRODUCTION FACILITIES WITH EXPLAINABILITY

(71) Applicant: Siemens Aktiengesellschaft, Munich (DE)

(72) Inventor: Sonja Zillner, Diessen am Ammersee (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 347 days.

(21) Appl. No.: 17/437,861

(22) PCT Filed: Mar. 9, 2020

(86) PCT No.: PCT/EP2020/056152
§ 371 (c)(1),
(2) Date: Sep. 10, 2021

(87) PCT Pub. No.: WO2020/182706
PCT Pub. Date: Sep. 17, 2020

(65) Prior Publication Data
US 2022/0172146 A1 Jun. 2, 2022

(30) Foreign Application Priority Data
Mar. 13, 2019 (EP) ..................... 19162595

(51) Int. Cl.
*G06Q 10/00* (2023.01)
*G06N 5/04* (2023.01)
*G06Q 10/0639* (2023.01)

(52) U.S. Cl.
CPC ......... *G06Q 10/06395* (2013.01); *G06N 5/04* (2013.01)

(58) Field of Classification Search
CPC .................. G06Q 10/06395; G06N 5/04
See application file for complete search history.

(56) References Cited

U.S. PATENT DOCUMENTS

| 5,239,617 A | 8/1993 | Gardner et al. |
| 2017/0337261 A1 | 11/2017 | Wang |

(Continued)

FOREIGN PATENT DOCUMENTS

| CN | 106057200 A | 10/2016 |
| CN | 106407196 A | 2/2017 |
| EP | 0436459 A1 | 7/1991 |

OTHER PUBLICATIONS

Abele et al., "An ontology-based approach for decentralized monitoring and diagnostics", Proceeding of the 12th IEEE International Conference on Industrial Informatics, INDIN 2014, Porto Alegre, RS, Brazil, Jul. 27-30, 2014; 2014.

(Continued)

*Primary Examiner* — Rutao Wu
*Assistant Examiner* — Tyrone E Singletary
(74) *Attorney, Agent, or Firm* — Schmeiser, Olsen & Watts LLP

(57) ABSTRACT

Provided is a system for feedback-improved automatic solving of production facility related tasks, including: an input interface being adapted to receive production facility related data; a semantic data enhancement module being adapted to generate semantically enhanced data based on the production facility related data; a semantic-based reasoning module being adapted to automatically provide an explainable artificial intelligence model, using the semantically enhanced data, wherein the artificial intelligence model relates to a predetermined production facility related task; a user interaction interface being adapted to output explanation data regarding the explainable artificial intelligence model to a user; and a feedback module adapted to receive feedback (Continued)

Figure 1:
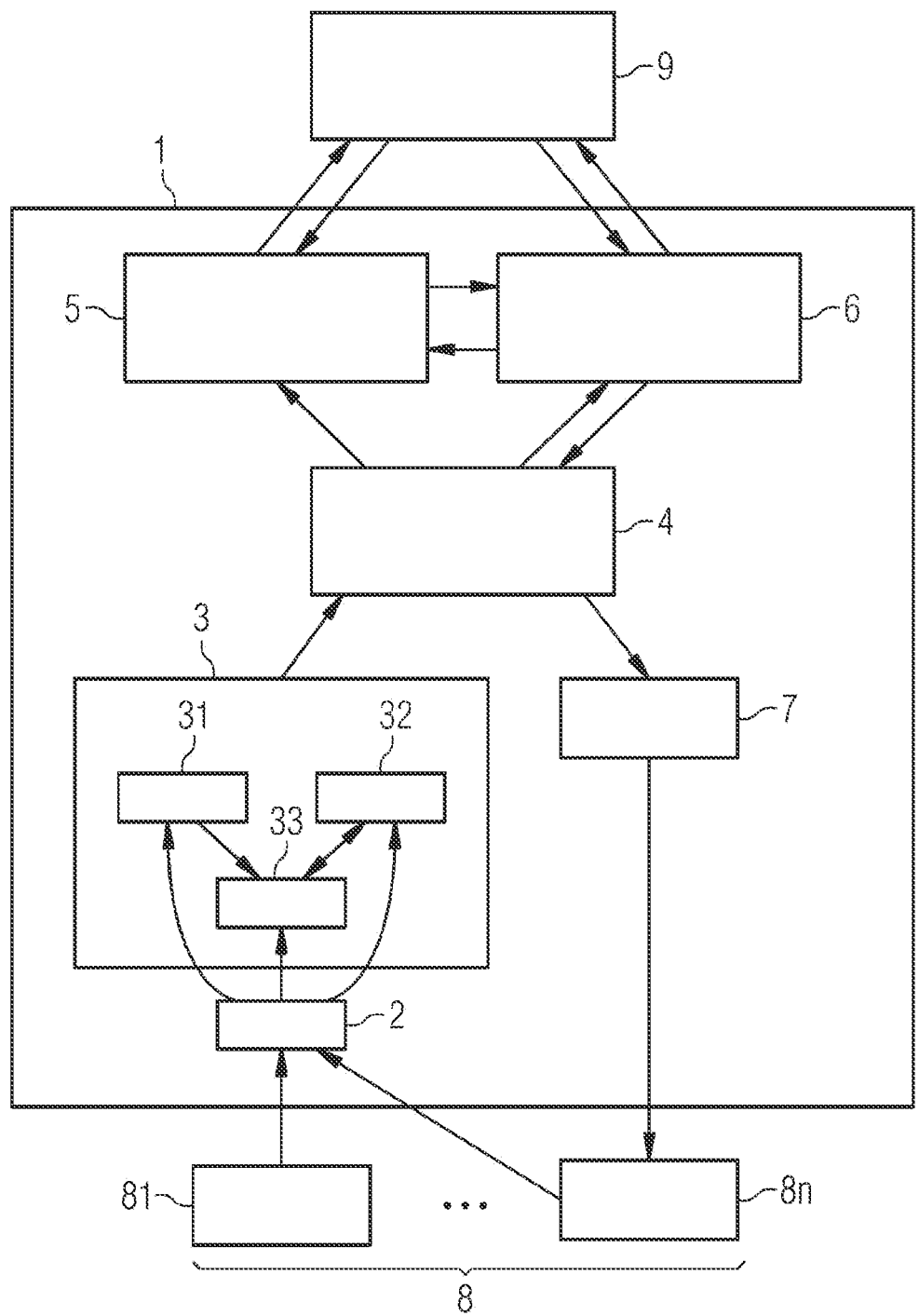

from the user in response to the outputted explanation data and adapted to adjust the semantic-based reasoning module and/or the user interaction interface based on the received feedback.

13 Claims, 2 Drawing Sheets

(56) References Cited

U.S. PATENT DOCUMENTS

| | | | | |
|---|---|---|---|---|
| 2019/0114549 | A1* | 4/2019 | Olsher | G06F 40/30 |
| 2021/0124597 | A1* | 4/2021 | Ramakrishnan | G06N 20/00 |
| 2021/0303932 | A1* | 9/2021 | Stefik | G06N 5/01 |
| 2023/0245651 | A1* | 8/2023 | Wang | G10L 25/63 |
| | | | | 704/275 |

OTHER PUBLICATIONS

Pistofidis et al., "Modelling the semantics of failure Context as a means to offer context-adaptive maintenance applications. In the Proceedings of the European conference of the prognostics and health management society", 2014; 2014.

Panfilenko et al., "BPMN for Knowledge Acquisition and Anomaly Handling in CPS for Smart Factories", Proceedings of the IEEE International Conference on Emerging Technology & Factory Automation to be held in Berlin, Germany, ETFA 2016; 2016.

Stumpf S et al: "Interacting meaningfully with machine learning systems: Three experiments", International Journal of Human-Computer Studies, Elsevier, Amsterdam, NL, vol. 67, No. 8, pp. 639-662, XP026170314, ISSN: 1071-5819, DOI: 10.1016/J.IJHCS. 2009.03.004; [retrieved on Apr. 9, 2009]; Abstract; Sections 1, 3; 2009.

Sharp et al., "A survey of the advancing use and development of machine learning in smart manufacturing", Elsevier, Journal of Manufacturing Systems, 48, Mar. 2018; 2018.

Broad Agency Announcment, Explainable Artificial Intelligence, DARPA report, DARPA-BAA-16-53, Aug. 2016; 2016.

Gurevych Iryna et al.: "Interactive Data Analytics for the Humanities", International Conference on Computer Analysis of Images and Patterns. CAIP 2017: Computer Analysis of Images and Patterns; [Lecture Notes in Computer Science; Lect.Notes Computer], Springer, Berlin, Heidelberg, pp. 527-549, XP047489447, ISBN: 978-3-642-17318-9 [retrieved on Oct. 10, 2018]; Abstract, Section 5-7; 2018.

Zillner et al., Towards intelligent manufacturing, semantic modelling for the steel industry, Proceedings of the 17th IFAC Symposium on Control, Optimization and Automation in Mining, Mineral and Metal Processing, Vienna, Austria, 2016; 2016.

Zillner et al., "A semantic modelling approach for the steel production domain", Proceedings of the 1st European Steel Technology & Application Days (ESTAD), Paris, France, Apr. 2014.

Zhou et al., "A research on intelligent fault diagnosis of wind turbines based on ontology and FMECA", Elsevier Journal of Advanced Engineering Informatics 29, p. 115-125, 2015; 2015.

Choo Jaegul et al.: "Visual Analytics for Explainable Deep Learning", IEEE Computer Graphics and Applications, IEEE Service Center, New York, NY, US, vol. 38, No. 4, pp. 84-92, XP011686421, ISSN: 0272-1716, DOI: 10.1109/MCG.2018.042731661; [retrieved on Jul. 3, 2018]; the whole document; 2018.

Anupma Yadav & S.C. Jayswal, "Modelling of flexible manufacturing system: a review", International Journal of Production Research, 56:7, 2464-2487, 2018; 2018.

Barz et al., "Human-in-the-Loop Control Processes in Industry 4.0 Factories", Proceedings of 8th International Conference on Industrial Applications of Holonic and Multi-Agent Systems (HoloMAS2017), Lyon, France, 2017; 2017;.

PCT International Search Report and Written Opinion of International Searching Authority mailed Jan. 7, 2020 corresponding to PCT International Application No. PCT/EP2020/056152 filed (Sep. 3, 2020.

Extended European Search Report dated Sep. 23, 2019 for Application No. 19162595.3.

* cited by examiner

APPARATUS FOR THE SEMANTIC-BASED OPTIMIZATION OF PRODUCTION FACILITIES WITH EXPLAINABILITY

CROSS-REFERENCE TO RELATED APPLICATIONS

This application claims priority to PCT Application No. PCT/EP2020/056152, having a filing date of Mar. 9, 2020, which is based on EP Application No. 19162595.3, having a filing date of Mar. 13, 2019, the entire contents both of which are hereby incorporated by reference.

FIELD OF TECHNOLOGY

The following relates to a system for feedback-improved automatic solving of production facility related tasks, to a computer implemented method for feedback-improved modelling of production facility related tasks and to a computer program product and to a non-transitory, computer readable storage medium related to the computer-implemented method.

BACKGROUND

Traditionally, manufacturing facilities rely on hardcoded, non-flexible production or manufacturing routines and control profiles. For example, the trajectory of the machinery is determined by the logic of manually programmed control scripts which deterministically define the precise movement and timing of the machine.

The lack of adaption to changing conditions may be overcome by implementing Artificial Intelligence (AI) techniques such as machine learning or deep learning. An overview is given in Anupma Yadav & S. C. Jayswal, "Modelling of flexible manufacturing system: a review", International Journal of Production Research, 56:7, 2464-2487, 2018.

The extent to which AI technologies are already used for advancing manufacturing systems is given in Sharp et al., "A survey of the advancing use and development of machine learning in smart manufacturing", Elsevier, Journal of Manufacturing Systems, 48, March 2018.

In order to improve the use of available data, semantic-based applications have been suggested, in particular in the following references:

Zhou et al, "A research on intelligent fault diagnosis of wind turbines based on ontology and FMECA", Elsevier, Journal of Advanced Engineering Informatics, 29, page 115-125, 2015;

Pistofidis et al., "Modeling the semantics of failure Context as a means to offer context-adaptive maintenance applications", Proceedings of the Second European conference of the prognostics and health management society, Nantes, France, 2014;

Barz et al., "Human-in-the-Loop Control Processes in Industry 4.0 Factories", Proceedings of 8th International Conference on Industrial Applications of Holonic and Multi-Agent Systems (HoloMAS2017), Lyon, France, 2017;

Panfilenko et al., "BPMN for Knowledge Acquisition and Anomaly Handling in CPS for Smart Factories", Proceedings of the IEEE International Conference on Emerging Technology & Factory Automation, Berlin, Germany, ETFA 2016;

Zillner et al., "Towards intelligent manufacturing, semantic modelling for the steel industry", Proceedings of the 17th IFAC Symposium on Control, Optimization and Automation in Mining, Mineral and Metal Processing, Vienna, Austria, 2016;

Abele et al., "An ontology-based approach for decentralized monitoring and diagnostics", Proceeding of the 12th IEEE International Conference on Industrial Informatics, INDIN 2014, Porto Alegre, RS, Brazil, July 2014;

Zillner et al., "A semantic modelling approach for the steel production domain", Proceedings of the 1st European Steel Technology & Application Days (ESTAD), Paris, France, April 2014;

Broad Agency Announcement, Explainable Artificial Intelligence, DARPA report, DARPA-BAA-16-53, August 2016; and Gurevych et al., "Interactive Data Analytics for the Humanities", International Conference on Computer Analysis of Images and Patterns, Springer, p. 527-549, October 2018.

Many AI applications are based on black-box machine learning algorithms, such as deep learning neural networks, support vector machines or reinforcement learning. In general, no or only little explanation is provided how the results or recommendations are derived.

Because of a lack of understanding how the new AI-based control mechanisms operate and derive their results, it is very difficult for expert users to interact with the control loops of the machines. One consequence is that expert users may hesitate to trust the outcomes of the AI techniques, another consequence being that it is difficult to include the experts' knowledge in improving the AI techniques.

SUMMARY

An aspect relates to a system and a method for feedback-improved automatic solving of production facility related tasks which allow for seamless cooperation and interaction between (expert) users and AI-based machines.

According to a first aspect, a system for feedback improved automatic solving of production facility related tasks is provided. The system comprises an input interface which is adapted to receive production facility related data. The system further comprises a semantic data enhancement module which is adapted to generate semantically enhanced data based on the production facility related data. A semantic-based reasoning module is adapted to provide an explainable artificial intelligence model, wherein the semantic-based reasoning module is adapted to use the semantically enhanced data. The artificial intelligence model relates to a predetermined production facility related task and is adapted to solve the production facility related task. The system comprises a user interaction interface which is adapted to output explanation data regarding the explainable artificial intelligence model to a user. Further, the system comprises a feedback module which is adapted to receive feedback from the user in response to the outputted explanation data. The feedback module is adapted to adjust the semantic-based reasoning module and/or the user interaction interface based on the received feedback.

According to a second aspect, embodiments of the invention provide a method for feedback-improved modelling of production facility related tasks. The method comprises receiving production facility related data by an input interface. The method further comprises generating, by a computing device (e.g., by a semantic data enhancement module), semantically enhanced data based on the production facility related data. An explainable artificial intelligence model is provided by a computing device (e.g., by a semantic-based reasoning module) using the semantically enhanced data. The artificial intelligence model relates to a predetermined production facility related task and may provide a solution the production facility related task. Explanation data regarding the explainable artificial intelligence model is outputted to a user by a user interaction interface. Feedback is received by a feedback module from the user in response to the outputted explanation data. The semantic-based reasoning module and/or the user interaction interface is adapted by the feedback module based on the received feedback.

Embodiments of the invention can provide a semantic-based mechanism for the optimized operation of production facilities which provides explanations for each optimization option, establishing the basis for the informed interaction and decision-making of an expert user while continuously learning from interaction with the user and feedback from the user. The expert user can focus on ambitious and creative tasks instead of repetitive tasks which are taken over by the system.

Embodiments of the invention provide explanation data to the user which can help the user to understand how the explainable artificial intelligence model or certain results derived using the explainable artificial intelligence model are obtained. An explainable artificial intelligence model differs from black-box approaches by providing additional explanations which are presented to the user to understand the underlying functioning of the artificial intelligence model. The explainable artificial intelligence model may be trained to solve optimization problems. The explainable artificial intelligence model may implement any known method, examples being layer-wise relevance propagation, counterfactual methods, local interpretable model-agnostic explanations, generalized additive models or rationalization.

The better insight of the user can help to improve the artificial intelligence model using the expert knowledge by providing feedback. The feedback can be used to automatically improve the artificial intelligence model by reinforcement learning. Alternatively or additionally, the feedback can be used to automatically adjust the explanation data presented to the user. A synergetic effect of adjusting both the semantic-based reasoning module and the user interaction interface is that by steadily improving the machine-human interaction by presenting more suitable information to the user, the feedback of the user is improved which can in turn help to improve the semantic-based reasoning module.

Explanation data derived from an explainable artificial intelligence model based on semantically enhanced data can help the user to understand the solutions of the predetermined production facility related task obtained based on the artificial intelligence model even without detailed understanding of the underlying AI concepts.

Often, AI applications are only implemented on level 0 (process), level 1 (sense) or level 2 (monitor) of the conceptual topology of manufacturing IT systems. Using semantic technologies, giving the user explanations relating to the underlying AI processes, and giving the user the opportunity to provide feedback can help to use AI techniques also on level 3 (manufacturing operations management) and level 4 (business planning and logistics).

In some advantageous embodiments of the system, the production facility related data received by the input interface can comprise data from external devices or databases, including sensor data obtained by certain machines of the production facility or configuration data with regard to the machines of the production facility. The data may be transferred to the system via the input interface. Additionally or alternatively, at least some of the data may be stored on external devices or databases in order to save storage space and the system can access the data via the input interface.

In some advantageous embodiments of the system, the semantic data enhancement module comprises a semantic mapper which is adapted to automatically map data structures of the production facility related data in a foundational semantic model. The semantic mapper is further adapted to generate the semantically enhanced data using the foundational semantic model. The semantically enhanced or semantically annotated data is used as input for reasoning by the semantic-based reasoning module to solve optimization problems. The semantic mapper may be adapted to enhance unstructured production facility related data by adding semantic labels. The semantic mapper ensures that semantic representations of the production facility related data are available.

In some advantageous embodiments of the system, the semantic data enhancement module comprises a storage device adapted to store the generated semantically enhanced data.

In some advantageous embodiments of the system, the semantic data enhancement module is adapted to generate the semantically enhanced data by semantically labeling the production facility related data using knowledge graphs and/or domain ontologies and/or context models.

The knowledge graphs, domain ontologies or context models may provide the corresponding labels for annotating the production facility related data and may provide the required background knowledge for enhancing the production facility related data by process, context and situational meta-labels. Knowledge graphs may be considered as representing a collection of interlinked descriptions of entities, the entities being real-world objects, events, situations or abstract concepts. Domain ontologies are modelling domain specific definitions of terms. Context models define the way context data is structured and maintained. The context is described in a formal way and simplifies the description of greater structures.

In some advantageous embodiments of the system, knowledge graphs may be task or skill models adapted to describe tasks or skills of a machine of the production facility, wherein the tasks or skills may comprise which equipment, products or tasks can be accomplished, material that can be worked on, or processes, tasks or activities needed to manufacture a product, such as cutting, moving or pressing. A generic knowledge model, such as a foundational model, may determine how the machine skills and production tasks are formally described. In addition, the semantic data enhancement module may comprise instantiations of the task or skill models, i.e. semantically enhanced data from data that has been semantically mapped to the skill of the machine and the production task.

In some advantageous embodiments of the system, the semantic data enhancement module comprises a storage device adapted to store information regarding at least part of the knowledge graphs and/or domain ontologies and/or context models used by the semantic data enhancement module to generate the semantically enhanced data.

In some advantageous embodiments of the system, the semantic-based reasoning module is adapted to provide the explainable artificial intelligence model based on at least one of inductive logical programming, (automated) reasoning and semantic matching. (Inductive) logical programming is based on formal logic and deals with sets of sentences and logical forms which express facts and rules about a problem domain. Programs are separated into logical components and control components. Inductive logical programming can be used to derive new hypotheses based on logical programming. Automated reasoning allows computers to automatically reason, i.e. to deduce certain results or conclusions. Automated reasoning can make knowledge captured in knowledge graphs explicit. Semantic matching allows to identify nodes in two structures (such as classifications or ontologies) which semantically correspond to each other. Semantic matching can align constraints of different knowledge graphs as well as constraint or goal driven planning to align workflows or processes with the (physical) constraints specified in the related knowledge models such as a machine skill model.

In some advantageous embodiments of the system, the explainable artificial intelligence model provides an advice to a user how to perform the predetermined production facility related task. The explanation data to be outputted by the user interaction interface comprises the advice how to perform the predetermined production facility related task. The advice may comprise production optimization actions, choices of certain options or recommendations.

In some advantageous embodiments of the system, the explainable artificial intelligence model provides control information for controlling a machine of the production facility and provides information explaining the control information to a user. The explanation data to be outputted by the user interaction interface comprises the information explaining the control information.

In some advantageous embodiments, the system further comprises a control module which is adapted to control a production facility machine based on the control information. For example, parameters of the production facility machine may be adjusted based on the control information. The complete manufacturing process can be controlled based at least partially on the control information obtained by the semantic-based reasoning module.

In some advantageous embodiments of the system, the user interaction interface is adapted to provide the explanation data using natural language. Therefore, human decision-making process is augmented by providing explanations on the right level of understanding while continuously learning from users' interaction and feedback.

According to embodiments of the invention, the user interaction interface is adapted to generate behavioral data describing how the user navigates the explanation data, wherein the explanation data encompasses information about how the explainable intelligence model was generated. The feedback module is adapted to use the behavioral data to improve or adjust the user interaction interface. For example, the user interaction interface may be adapted to analyze which questions the user asks to get further information regarding the explainable artificial intelligence model.

In some advantageous embodiments of the system, the user interaction interface is adapted to present the explanation data to the user based on a mental model of the user. The feedback module is adapted to assess the impact or relevance of the explanation data in accordance with the mental model based on the feedback. The mental model reflects the problem and solution model of the underlying problem space. It is modelling the underlying decision process of the user (e.g., based on experience-based or discipline-based know how) and ensures that humans and machines can cooperate in a synergetic way. The mental model ensures that only relevant information is presented to the user. The mental model therefore influences which information is regarded to be relevant for the user to take certain decisions or to understand the solution to the predetermined production facility related task obtained based on the artificial intelligence model.

By assessing the impact or relevance of the explanation data, improvement can be achieved as to which information is to be presented to the user. The improvement may consist in omitting unnecessary information which the user does not need to understand or implement the solution. The improvement may additionally or alternatively consist in providing additional data which may be helpful for the user to understand the solution of the production facility related task.

Therefore, depending on the feedback of the user, more or less information can be presented in the explanation data outputted by the user interaction interface to the user.

In some advantageous embodiments of the system, the semantic-based reasoning module is adapted to adjust the explainable artificial intelligence model by reinforcement learning, based on the feedback received by the feedback module from the user. Parameters of the explainable artificial intelligence model may be changed based on the feedback received by the feedback module from the user. The feedback module may also compute an error vector comparing the solution computed by the semantic-based reasoning module based on the explainable artificial intelligence model which solves the predetermined production facility related task with actual data describing the actual implementation in the production facility process. The data may be obtained from the user or may be automatically received by the input interface.

In some advantageous embodiments of the system, the feedback received by the feedback module from the user comprises indicators describing at least one of the following: a user satisfaction, a degree of correspondence of the explanation data and the mental model, a trust building value, and added value of the system in solving the predetermined production facility related task.

Embodiments of the invention also provide a computer program comprising executable program code configured to, when executed (e.g., by a computing device), perform the method according to the second aspect of embodiments of the invention.

Embodiments of the invention also provide a non-transitory computer-readable data storage medium comprising executable program code configured to, when executed (e.g., by a computing device), perform the method according to the third aspect of embodiments of the invention.

Embodiments of the invention also provide a data stream comprising (or configured to generate) executable program code configured to, when executed (e.g., by a computing device), perform the method according to the second aspect of embodiments of the invention.

The computing device as well as some or all components of the system may comprise hardware and software components. The hardware components may comprise at least one of microcontrollers, central processing units (CPU), memories and storage devices.

BRIEF DESCRIPTION

Figure 2:
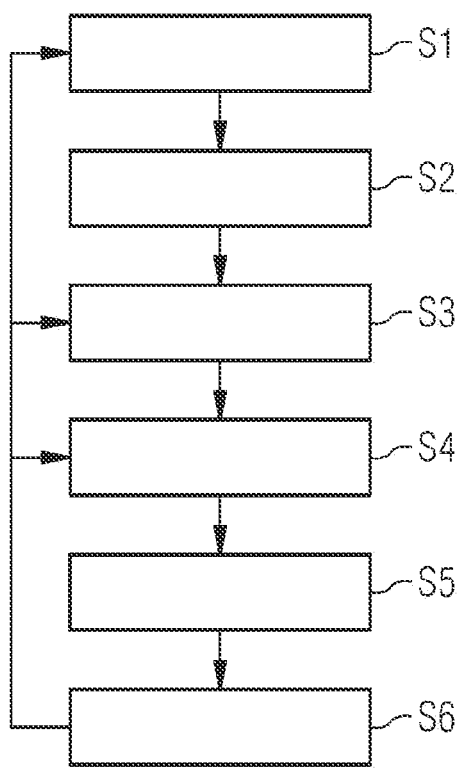
Figure 3:
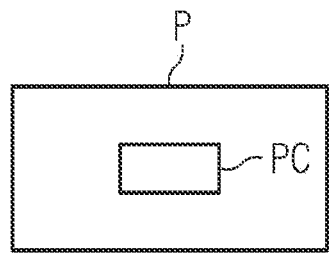
Figure 4:
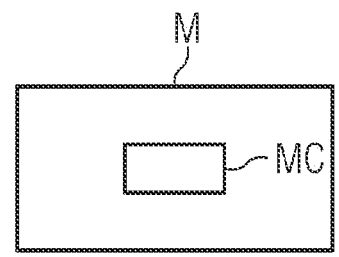

Some of the embodiments will be described in detail, with references to the following Figures, wherein like designations denote like members, wherein:

FIG. 1 schematically shows a block diagram illustrating a system for feedback-improved automatic solving of production facility related tasks according to an embodiment of the invention;

FIG. 2 schematically illustrates a flowchart of a method for feedback-improved modelling of production facility related tasks according to an embodiment of the invention;

FIG. 3 schematically illustrates a block diagram illustrating a computer program product according to an embodiment of the invention; and FIG. 4 schematically illustrates a block diagram illustrating a non-transitory, computer-readable storage medium according to an embodiment of the invention.

DETAILED DESCRIPTION

FIG. 1 schematically illustrates a block diagram of a system 1 for feedback-improved automatic solving of production facility related tasks. A production facility may comprise any building or area where goods are produced or manufactured, examples being oil, gas, beer bottles or vehicles. This may include any facility which is used in the production or manufacturing of an asset or product of a certain kind, including the processing that results in changing the condition of assets or products. A production facility can be conceptualized as the sum of all equipment that is used for producing particular assets or products.

The production facility related task may generally refer to any optimization problem for determining decisions or choosing options related to the production facilities. The production facility related task may comprise maintenance predictions such as forecasting the outage of an engine or another important part of a production line. The production facility related task may also comprise the optimization of control parameters ensuring the improved operation of the production facility. Examples are reduction of energy consummation or reduction of carbon dioxide footage. As another example, the production facility related task may relate to providing an optimal sequence of activities required for manufacturing a certain product.

The system 1 comprises an input interface 2, which may comprise any kind of wireless or wired connection which receives data or exchanges data with external data sources 8. The external data sources 8 may comprise databases providing production facility data 81 which comprises operational data, facility data, documents, descriptions or configuration data related to machines or devices of the production facility. The external data sources 8 may also comprise production facility machines or devices 8*n*. For example, the machines may comprise sensors for generating sensor data and the sensor data may be transmitted as facility related data to the input interface 2. The input interface 2 may be connected with any number n of individual data sources. The input interface 2 may also be adapted to access data directly via a connection without storing the data in the system 1 itself. The production facility related data may also comprise information regarding semantic models.

The system 1 further comprises a semantic data enhancement module 3 which is connected to the input interface 2. Based on semantic models received by the input interface 2 or stored in internal storing devices of the system 1, the semantic data enhancement module 3 generates semantically enhanced data based on the production facility related data. The semantic data enhancement module 3 comprises a first data storage component 31 adapted to store domain ontologies and/or context models. At least some of the information regarding the domain ontologies and/or context models may be received via the input interface 2. The semantic data enhancement module 3 further comprises a second data storage component 32 adapted to store the semantically enhanced data generated by the semantic data enhancement module 3. Production facility related data received from the input interface 2 may be stored in the second data storage component 32 and may be enhanced by adding semantic labels. A data storage device such as any conventional memory for storing data may comprise the first data storage component 31 and the second data storage component 32.

The semantic data enhancement module 3 comprises a semantic mapper 33 which is adapted to automatically map data structures of the production facility related data in a foundational semantic model in order to generate semantically enhanced data using the foundational semantic model, domain ontologies and context models. For example, sensor data obtained from a production facility machine 8*n* may be labeled as corresponding to a certain type of sensor data from a certain production facility machine 8*n*. The semantic mapper 33 may be adapted to generate semantically enhanced data using knowledge graphs and/or domain ontologies and/or context models.

The system 1 further comprises a semantic-based reasoning module 4 which is connected to the semantic data enhancement module 3. The semantic-based reasoning module 4 can access the semantically enhanced data stored in the second data storage component 32 and uses the semantically enhanced data to provide an explainable artificial intelligence model.

The explainable artificial intelligence model may be considered to comprise an artificial intelligence algorithm together with explanations regarding the algorithm. The explainable artificial intelligence model may be adapted to solve a specific task in the production facility and may give advice or recommendation how to solve the task. The expendable artificial intelligence model may additionally or alternatively be adapted to produce new improved control information or policies allowing machines of the production facility to accomplish specific tasks in improved manner (related to some predefined optimization task), together with explanation which is presented to the user.

The system 1 further comprises a user interaction interface 5 which is adapted to output explanation data regarding the explainable artificial intelligence model to a user 9. The user interaction interface 5 may comprise a display and an input device such as a keyboard or touch screen which helps the user 9 to input information or select options presented to the user 9.

The user interaction interface 5 is based on an interface allowing the presentation of understandable explanations. The design of the interface and user dialogue considers the cognitive tasks of the user 9 as well as the mental model of the user interaction. The user interaction interface 5 may take the production process, machine skills and production steps into account. The user interaction interface 5 presents simple hypotheses in natural language to the user based on the explainable artificial intelligence model and using the mental model. The user 9 can interact with the user interaction interface 5 by asking further questions or by exploring or navigating the explanation data. The user interaction interface 5 therefore helps the user 9 to understand the underlying way of functioning of the explainable artificial intelligence model without requiring specific AI programming competences. The user 9 will understand the rationale why the explainable artificial intelligence model is or is not recommending and/or performing certain actions. The user interaction interface 5 may be configured to provide the user explanation data regarding the underlying assumptions of the explainable artificial intelligence model as well as explanation data regarding when the explainable artificial intelligence model is expected to succeed or fail. The user 9 can determine at an early stage if the results of the explainable artificial intelligence model are trustable based on false or insufficient assumptions.

The system 1 further comprises a feedback module 6 which is adapted to receive feedback from the user 9 in response to the outputted explanation data. The feedback module 6 allows to incorporate human feedback to improve the overall performance of the explainable artificial intelligence model. The feedback from the user 9 is related to the specific production facility related task solved by the explainable artificial intelligence model.

The feedback module 6 may comprise a user dialogue which allows the user to provide feedback to certain predefined questions. The questions may comprise if the user 9 is satisfied with the explanation data, i.e. if the explanation data provided by the user interaction interface 5 was sufficiently clear and useful. The feedback module 6 may also ask the user 9 for feedback regarding the degree to which the user interaction interface 5 reflects the mental model of the user 9. For example, the user 9 may be asked if the proposed actions or recommendations fitted to the decision rationale of the user 9 and if the user 9 can build or reuse insights gained by the explanation data provided by the user interaction interface 5. The user 9 may give feedback if the user 9 was able to interact with the system 1 to get the information needed. In particular, the user 9 may describe if the provided information was sufficient or if additional information was lacking. The user 9 may also describe that some of the information was not needed for taking a decision. The feedback module 6 may also check if the user 9 trusts the system 1. The user 9 can provide information if the explanation data was sufficient and convincing such that the user 9 could rely on the results of the explainable artificial intelligence model. The user 9 may also provide feedback if the system 1 provides added value, i.e. if the system 1 helps to accomplish the predetermined production facility related task in better quality or with higher performance.

The feedback module 6 can be adapted to use the received feedback to improve the systems in two ways, namely by improving the underlying AI models used by the semantic-based reasoning module 4, and by improving the interaction of the user 9 with the system 1 by adjusting the user interaction interface 5.

With regard to the first aspect, the feedback module 6 may adjust the semantic-based reasoning module 4. The feedback module 6 may be adapted to continuously improve the semantic-based reasoning module 4 by feedback loops, i.e. reinforcement learning assessing how well the intended production facility related task has been addressed by the semantic-based reasoning module 4. The reinforcement learning algorithms may be implemented by the feedback module 6 and the semantic-based reasoning module 4. The feedback module 6 may give the user 9 an opportunity to share observations regarding the impact of past actions of the system 1 in discrete time steps. At each time step, the user 9 will input his observations and feedback into the feedback module. The feedback module 6 analyzes the degree to which the intended goal related to the production facility related task has been accomplished and adjusts the explainable artificial intelligence model. For example, an error vector may be generated and taken to train a neural network of the explainable artificial intelligence model. By continuously assessing the performance of the semantic-based reasoning module 4 in accordance to a specific predetermined production facility related task, the system 1 can be continuously improved.

With regard to the second aspect, the feedback module 6 may adjust the user interaction interface 5 based on the feedback. For example, the feedback module 6 may assess the behavioral data generated by the user interaction interface 5. The feedback module 6 may determine based on the feedback if the explanation data was helpful to the user 9. The relevance of the explanation data is analyzed in accordance with the mental model and the explanation data outputted to the user 9 is adjusted based on the analysis.

Optionally, the system 1 further comprises a control module 7 which is adapted to control a production facility machine 8n based on the control information. The complete algorithm controlling the machine 8n may be determined based on the control information. It may also be possible to only adjust certain parameters of the production facility machine 8n based on the control information.

FIG. 2 shows a flowchart describing a computer-implemented method for feedback-improved modelling of production facility related tasks. The method can be performed using a system 1 described above.

In a first method step S1, production facility related data is received by an input interface 2. The data may be stored locally or may also be accessed via a wireless or wired connection. For example, the data may be at least partially stored on an external server. Data sources from the production facility may be connected to a semantic data storage component.

In a second method step S2, semantically enhanced data is generated based on the production facility related data. A semantic mapper 33 may automatically map data structures of the production facility related data in a foundational semantic model. The semantic mapper 33 may generate the semantically enhanced data using the foundational semantic model. For generating the semantically enhanced data, knowledge graphs, domain ontologies and/or context models may be used. Production facility related data is represented in a semantic manner, i.e. by annotating data assets and items with semantic labels. The semantic representation of all related data sources from the production facility is obtained.

In a third method step S3, an explainable artificial intelligence model is provided by a semantic-based reasoning module 4, using the semantically enhanced data. The artificial intelligence model relates to a predetermined production facility related task, e.g., production planning. The production facility related task may be obtained from a user 9. The production facility related task may also be transmitted from external devices via the input interface 2. The user 9 may select the production facility related task together with associated parameters, for instance a set of products which are to be produced. In this way, the user 9 is asking the system 1 to compute the most efficient sequence of activities accomplished by the production facility for producing the selected items.

The artificial intelligence model may be adapted to solve a certain optimization problem related to the predetermined production facility related task. The explainable artificial intelligence model may provide advice to a user 9 how to perform the predetermined production facility related task. The explainable artificial intelligence model may also provide control information for controlling a machine 8n of the production facility and may provide information explaining the control information to a user 9. The explainable artificial intelligence model may be obtained based on logical programming, reasoning and/or semantic matching.

In a fourth method steps S4, explanation data regarding the explainable artificial intelligence model is outputted to a user 9 by a user interaction interface 5. The explanation data may comprise the advice how to perform the predetermined production facility related task. The explanation data may also comprise the information explaining the control information for controlling a machine 8n of the production facility. The explanation data may be generated based on a mental model of the user 9. The user 9 may interact with the user interaction interface 5, allowing the user 9 to navigate the explanation data, wherein the explanation data encompasses information about how the explainable intelligence model was generated. The user 9 may ask additional questions. In response to the questions, the user interaction interface 5 may generate new explanation data based on the mental model of the user 9 and on the explainable artificial intelligence model. The user interaction interface 5 may allow the user 9 to easily navigate (zoom in and zoom out) the knowledge model or explanation data that has been constructed during the reasoning process with regard to the explainable artificial intelligence model. The user interaction interface 5 may generate behavioral data describing how exactly the user 9 navigates the explanation data. In particular, the user interaction interface 5 may analyze additional questions posed by the user 9.

In a fifth method step S5, feedback is received from the user 9 from a feedback module 6 in response to the outputted explanation data. The feedback may comprise information or indicators describing the satisfaction of the user 9, the correspondence of the explanation data and a mental model used for providing the explanation data, a trust building value, and added value of the system 1 in solving the predetermined production facility related task. The feedback module 6 may receive as input the behavioral data describing how the user 9 is exploring the reasoning result or knowledge model. The feedback module 6 may further receive the results of the assessment of the explanation collected after each interaction from the user 9. The feedback module 6 may further receive feedback from the user 9 about the performance of elements of the reasoning results related to the selected task that needs to be performed. The feedback is transformed into information or parameters that can be used to improve the overall reasoning components.

In a sixth method step S6, the semantic-based reasoning module 6 is adapted based on the received feedback. Additionally or alternatively, the user interaction interface 5 is adjusted based on the received feedback. Adapting the user interaction interface 5 based on received feedback may be performed based on behavioral data generated by the user interaction interface 5. Further, the impact or relevance of the explanation data may be assessed in accordance with the mental model based on the feedback in order to adjust the explanation data presented to the user 9. The explainable artificial intelligence model may be adjusted by reinforcement learning, based on the feedback received by the feedback module 6 from the user 9.

After the sixth method step S6, new production facility related data may be received, S1. Alternatively, the explainable artificial intelligence model may be updated, S3, or the explanation data may be updated, S4.

A solution for the predetermined production facility related task obtained by the semantic-based reasoning module 4 may be used to automatically control external devices, such as a production facility machine 8n.

Data relating to the explainable artificial intelligence model, or certain components of the explainable artificial intelligence model, in particular explanation data regarding or extracted from the explainable artificial intelligence model can be stored on data storage components part of the system 1 or on external data storage components. In addition or alternatively, such data can be transmitted to external servers or devices for further analysis. In particular, an external controller device can be adapted to control devices or machines 8n of the production facility based on the transmitted data.

It should be understood that all advantageous options, variance in modifications described herein and the foregoing with respect to embodiments of the system according to the first aspect may be equally applied to embodiments of the method according to the second aspect, and vice versa.

In the foregoing detailed description, various features are grouped together in one or more examples for the purpose of streamlining the disclosure. It is to be understood that the above description is intended to be illustrative, and not restrictive. It is intended to cover alternatives, modifications and equivalents. Many other examples will be apparent to one skilled in the art upon reviewing the above specification.

FIG. 3 schematically illustrates a block diagram illustrating a computer program product (non-transitory computer readable storage medium having instructions, which when executed by a processor, perform actions) comprising an executable program code PC. The executable program code PC is configured to perform, when executed (e.g., by a computing device), the method according to the second aspect.

FIG. 4 schematically illustrates a block diagram illustrating a non-transitory, computer-readable storage medium M comprising executable program code MC configured to, when executed (e.g., by a computing device), perform the method according to the second aspect.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for feedback-improved automatic solving of production facility related tasks, the system comprising:
   a processor;
   a memory device coupled to the processor; and
   a computer readable storage device coupled to the processor, wherein the storage device contains program code executable by the processor via the memory device to implement a method comprising:
   receiving production facility related data;
   generating semantically enhanced data based on the production facility related data;
   providing an explainable artificial intelligence model, using the semantically enhanced data, wherein the explainable artificial intelligence model relates to a predetermined production facility related task;
   outputting explanation data regarding the explainable artificial intelligence model to a user, and generating behavioral data describing how the user navigates the explanation data;
   receiving feedback from the user in response to the outputted explanation data;

adapting an user interaction interface based on the feedback, wherein the behavioral data is used as input to adjust the user interaction interface;

adjusting the explainable artificial intelligence model using the feedback from the user, wherein the explainable artificial intelligence model is continuously learning by a feedback loop comprising the feedback from the user, the feedback loop being used to train a neural network of the explainable artificial intelligence model, and the explainable artificial intelligence model outputs control information related to the predetermined production facility task; and automatically controlling a production facility machine using the control information output by the explainable artificial intelligence model to perform the predetermined production facility task.

2. The system according to claim 1, wherein data structures of the production facility related data are automatically mapped in a foundational semantic model, and the semantically enhanced data is generated using the foundational semantic model.

3. The system according to claim 1, wherein the semantically enhanced data is generated by semantically labeling the production facility related data using knowledge graphs and/or domain ontologies and/or context models.

4. The system according to claim 1, wherein the explainable artificial intelligence model is provided based on at least one of inductive logical programming, reasoning, and semantic matching.

5. The system according to claim 1, wherein the explainable artificial intelligence model provides an advice to a user how to perform the predetermined production facility related task, wherein the explanation data to be outputted by the user interaction interface comprises the advice how to perform the predetermined production facility related task.

6. The system according to claim 1, wherein the explainable artificial intelligence model provides information explaining the control information to a user, wherein the explanation data to be outputted by the user interaction interface comprises the information explaining the control information.

7. The system according to claim 1, wherein the user interaction interface is configured to interact with the user, allowing the user to navigate the explanation data, wherein the explanation data encompasses information about how the explainable intelligence model was generated.

8. The system according to claim 1, further comprising presenting the explanation data to the user based on a mental model of the user, and assessing the impact or relevance of the explanation data in accordance with the mental model based on the feedback.

9. The system according to claim 8, wherein the explainable artificial intelligence model is adjusted by reinforcement learning, based on the feedback from the user.

10. The system according to claim 1, wherein the feedback comprises indicators describing at least one of: a user satisfaction, a degree of correspondence of the explanation data and the mental model, a trust building value, and added value of the system in solving the predetermined production facility related task.

11. A computer-implemented method for feedback-improved modelling of production facility related tasks, the method comprising:

receiving production facility related data;

generating semantically enhanced data based on the production facility related data;

providing an explainable artificial intelligence model, using the semantically enhanced data, wherein the explainable artificial intelligence model relates to a predetermined production facility related task;

outputting explanation data regarding the explainable artificial intelligence model to a user, and generating behavioral data describing how the user navigates the explanation data;

receiving feedback from the user in response to the outputted explanation data;

adapting an user interaction interface based on the received feedback, wherein the behavioral data is used as input to adjust the user interaction interface;

adjusting the explainable artificial intelligence model using the feedback from the user, wherein the explainable artificial intelligence model is continuously learning by a feedback loop comprising the feedback from the user, the feedback loop being used to train a neural network of the explainable artificial intelligence model, and the explainable artificial intelligence model outputs control information related to the predetermined production facility task; and automatically controlling a production facility machine using the control information output by the explainable artificial intelligence model to perform the predetermined production facility task.

12. A computer program product, comprising a computer readable hardware storage device having computer readable program code stored therein, said program code executable by a processor of a computer system to implement the method according to claim 11.

13. A non-transitory, computer-readable storage medium comprising executable program code configured to, when executed by a computing device, perform the method according to claim 11.

* * * * *